PAYSTATION TRUNK WITH TIME SIGNALS

Filed Dec. 26, 1956 2 Sheets-Sheet 1

INVENTOR.
CLARENCE E. LOMAX
BY C. A. Gulbrandsen
ATTY.

PAYSTATION TRUNK WITH TIME SIGNALS

Filed Dec. 26, 1956 2 Sheets-Sheet 2

INVENTOR.
CLARENCE E. LOMAX

BY

ATTY.

United States Patent Office 2,910,537

Patented Oct. 27, 1959

2,910,537

PAYSTATION TRUNK WITH TIME SIGNALS

Clarence E. Lomax, Chicago, Ill., assignor to General Telephone Laboratories, Incorporated, a corporation of Delaware Application December 26, 1956, Serial No. 630,556

5 Claims. (Cl. 179—6.31)

This invention relates in general to telephone systems and, in particular, to improved circuit arrangements for timing toll calls therein.

More specifically, the invention relates to an improved circuit arrangement for a combined line and recording trunk (hereinafter to be referred to as a CLR trunk), wherein a timing arrangement is shown which enables the operator to handle toll calls with greater efficiency.

In telephone systems wherein an operator completes and times certain of the calls, and where a specific time period such as 3 or 5 minutes is provided as an initial talking period, for which a specific charge is assessed, the calling party frequently requests the operator for a notification near the end of said initial period so as to avoid any overtime charge. This special service has been found to seriously interfere with operator efficiency. This problem is further increased where the initial time period may be either 3 or 5 minutes, depending on the destination of the call.

A further problem arises where the overtime charge is not assessed until after the call has been terminated. When such a system is employed, the operator must ring the calling telephone immediately after the call is terminated, and a distinctive signal is required at the operator's position in order to notify her that such termination has occurred.

Accordingly, it is a primary object of this invention to provide an improved timing arrangement in a CLR trunk, whereby the calling party is automatically notified that the initial time period is about to end, the operator is notified when said period has ended so that she may ticket the overtime period, and the operator is notified by means of a distinct and obvious signal that the call has been terminated during an overtime period.

A further object of this invention is to provide an arrangement as described in the above paragraph wherein the timing means is adjustable to handle two different initial time periods.

One feature of the invention is the provision of a supervisory lamp at the operator's position which is arranged to operate continuously when the initial time period has ended, and intermittently when the call is terminated subsequent to the initial period.

Another feature of the invention is the provision of a non-locking key at the operator's position, operation of which is effective to change the initial time period from 5 to 3 minutes.

Other objects and features of the invention will become evident upon examination of the following description, taken in conjunction with the accompanying drawings, in which:

Fig. 1 shows a schematic circuit diagram of the basic CLR trunk, together with block diagrams indicating the equipment between a particular paystation and said CLR trunk, and Fig. 2 shows a schematic circuit diagram of the operator's position together with the timing apparatus associated with said CLR trunk.

In order to facilitate a thorough understanding of the invention, a paystation, illustrated in block form as item 1 on Fig. 1, is shown in association with a selector, item 2, and the selector is shown connected to the input circuit of the CLR trunk. The dotted line between the paystation and the selector represents the line circuit normally associated with the calling line, a linefinder, and a paystation repeater.

The improved CLR trunk shown in Figs. 1 and 2 was designed for the primary purpose of giving service to paystations, but it can be used to serve both regular and paystation lines. Thus, provision is made for a paystation identification tone to be received by the operator when she receives a call over said trunk from a paystation. This feature will be described in more detail below.

As mentioned above, a paystation repeater is provided in the circuit, this repeater being located between the linefinder and selector. Assuming that a calling subscriber must dial a first digit "0" in order to engage the CLR trunk and complete a talking connection with the operator, and that the calling party at a paystation initiates a call that does not have to go through the operator, by dialing a first digit other than "0," a CLR trunk would not be engaged by the selector and the paystation repeater would then be effective to either refund or collect the deposited coins, depending upon whether or not the call was completed.

However, in the following discussion, it will be assumed that a call has been initiated at paystation 1 by the deposit of coins; that the line circuit, linefinder, repeater and selector have been seized; that the calling party has dialled the digit "0"; that the impulses have been repeated by the repeater and transmitted to selector 1; and that the selector wipers have been raised to the tenth level and then automatically rotated, all in the well-known manner.

The selector wipers rotate until an idle CLR trunk is seized, whereupon the operator is signalled of the incoming call by operation of lamp L1. The operator answers the call by connecting to the talking circuit through tip and ring contacts 203 and 204. The operator then completes the call, and when a talking connection is completed, depresses key 213.

Time pulses on 5 minute time pulse lead 126 are thereby rendered effective to cause the operation of motor magnet 150, which causes disks 160, 170, and 180 to rotate. Near the end of the 5 minute time period, cam 181 engages cam follower 182, causing time tone on lead 127 to be transmitted through contact 183 to the calling party. At the end of the 5 minute time period, cam 171 engages cam follower 172, and lamp L2 is operated to notify the operator that the initial time period has ended.

The operator again depresses key 213, which at this time causes the operation of relay 140; and also operates appropriate equipment (not shown) for ticketing the overtime period in the well-known manner. When the calling party hangs up, a circuit is completed from ground pulse lead 81 to cause the intermittent operation of lamp L2 and thereby notify the operator that the calling party has terminated the call during an overtime period. The operator immediately depresses a key (not shown) which closes a loop across contacts 203 and 204, causing relay 10 to operate and send ringing current to the calling paystation. The operator then requests the additional coins required, and collects them by depressing key 208.

If the call requested by the calling party has been of a type that is entitled to only a 3 minute initial time period, the operator would have then depressed key 215 before depressing key 213. Relay 130 would thereby have been operated, and time pulses on 3 minute time pulse lead 125 would have caused the operation of motor magnet 150.

*Detailed description*

Figure 1:
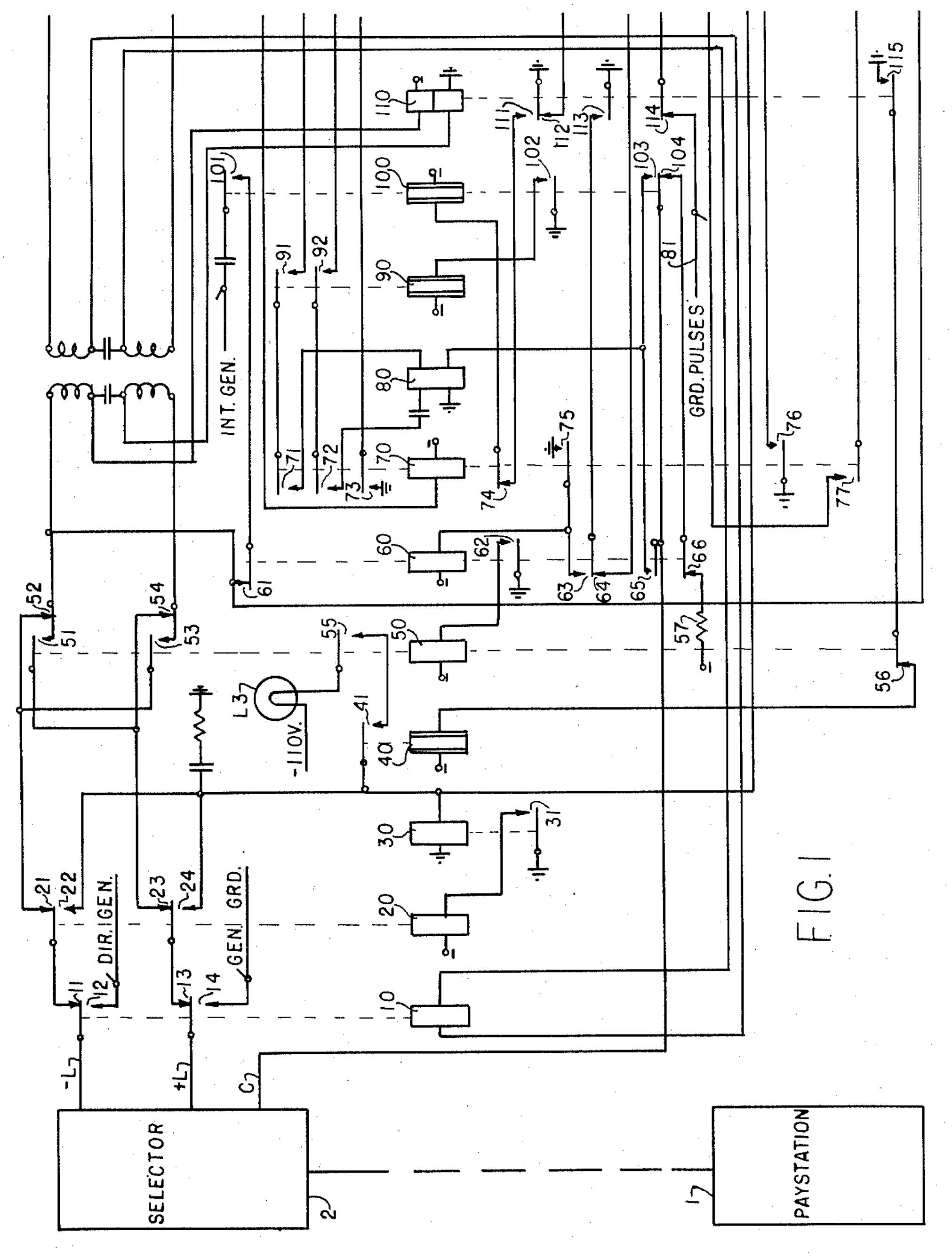
Figure 2:
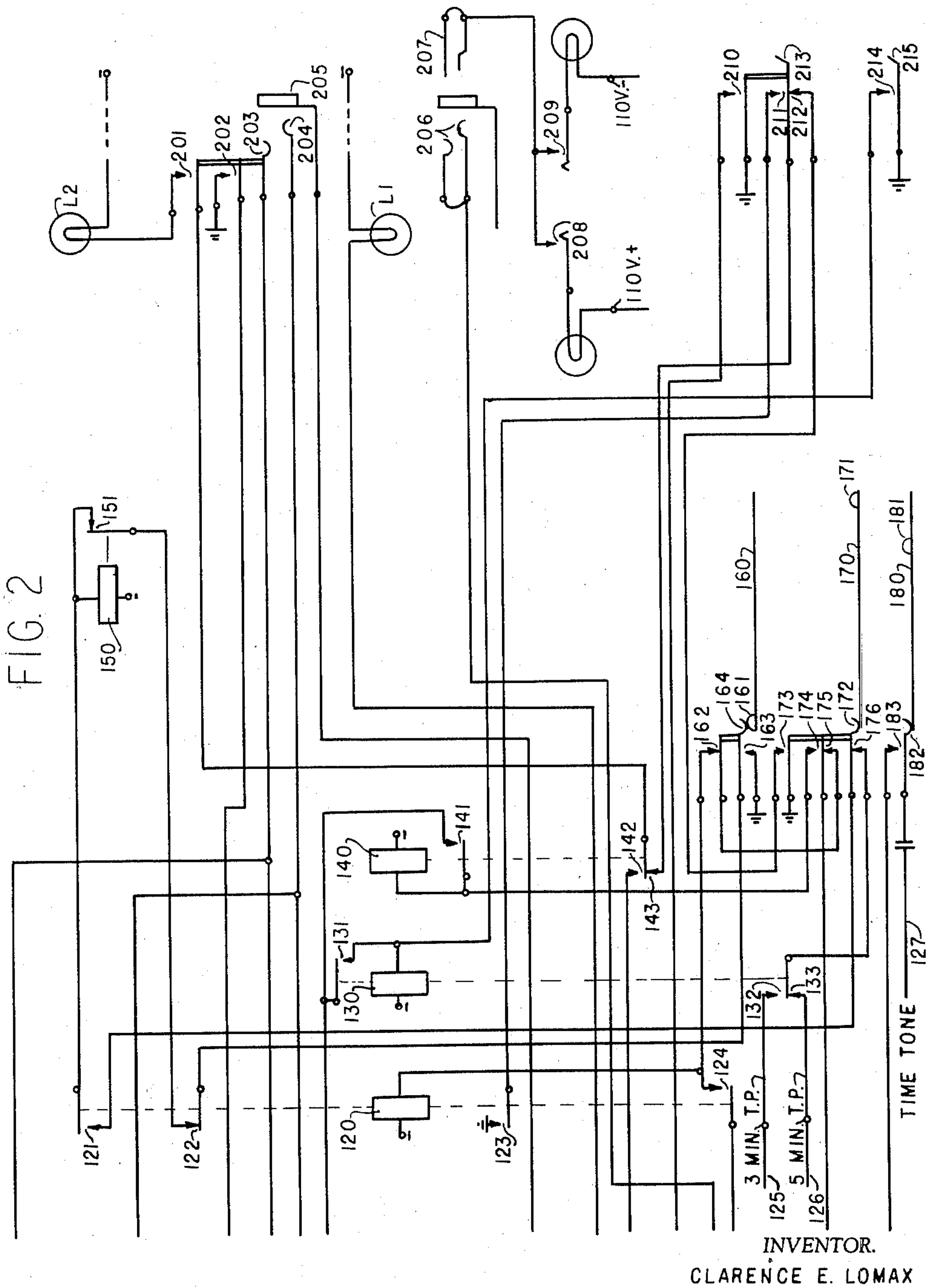

Figures 1 and 2 illustrate the circuit of a paystation CLR trunk, a group of such trunks being normally accessible from the bank of a selector switch. As pointed out in my copending application, filed April 24, 1956, Serial No. 580,314, trunks of this type are generally connected to the tenth level of the selector switch. Thus, when a subscriber dials the digit "0," the selector switch wipers move vertically to the tenth level in the well-known manner, and then rotate under the influence of a self-interrupted rotary magnet across the bank contacts of the tenth level. This self-interrupted rotation continues, in the well-known manner, until an idle CLR trunk is found. An idle CLR trunk is marked by battery potential on the "C" lead, this potential extending through a resistor such as 57, and then through contacts such as 66 and 104, and then over the C lead to the selector switch. When a CLR trunk is busy, this resistance battery circuit will be open at either contacts 66 or 104 to prevent the return of battery over the C lead, and the rotary movement of the selector switch wipers will continue past the contacts associated with a busy CLR trunk.

For purposes of this discussion, we will assume that the CLR trunk shown in Figures 1 and 2 has just been engaged by the wipers of the selector switch, the selector switch wipers are stopped by the battery potential through resistor 57, as described above, and the selector switch then switches through so as to place a closed loop across the −L and +L leads of the selected CLR trunk, in the well-known manner. Relay 110 then operates over a circuit including ground and the bottom half of relay 110, contacts 54, 23, and 13, the closed loop including the selector switch, contacts 11, 21 and 52, and the top half of relay 110 and battery.

The contacts associated with relay 110 cause the following operations. Contact 111 completes an obvious operating circuit for relay 100, including contacts 74; contact 112 removes ground from sleeve 205 of the operator's jack associated with this particular CLR trunk; contact 113 completes an obvious operating circuit for lamp L1, including contact 64; contact 114 opens a point in the circuit to ground pulse lead 81, the function of this lead to be described in detail below; and contact 115 completes an obvious operating circuit for relay 40, including contact 56.

Relay 100 operates, and the contacts associated therewith cause the following operations: contact 101 places ring back tone on the calling subscriber's line to indicate that the operator is being signalled, this circuit including contacts 61, 52, 21, and 11; contact 102 completes an obvious operating circuit for relay 90; contacts 103 and 104 cause the resistance battery to be removed from the C lead, and ground through the bottom winding of relay 80 to be placed on the C lead.

Relay 40 operates over the above-described circuit, closing contact 41. The circuit through contact 41, being open at contact 55, has no operative effect at this time.

Relay 90 operates, closing contacts 91 and 92, thereby preparing the circuit including the top winding of relay 80 over which the operator will receive a tone indicating that the call has originated at a paystation.

When lamp L1 lights, following the operation of relay 110, the operator knows that a call is incoming at the CLR trunk, and inserts a jack into sleeve 205, thereby closing contacts 201 and 202. The ground at contact 202 causes the operation of relay 70, and the contacts associated therewith cause the following operations. Contacts 71 and 72 complete the above-mentioned circuit through the top winding of relay 80, over which the paystation identification tone is received by the operator to indicate that the call originated at a paystation; contact 73 prepares a point in the locking circuits of relays 130 and 140; contact 74 opens the operating circuit of relay 100, but this relay remains operated momentarily due to its slow-release feature; contact 75 completes an obvious operating circuit for relay 60; contact 76 prepares a point in the locking circuit of relay 120; and contact 77 closes a point in the operating circuit of relay 120, this circuit to be described below.

The paystation identification tone mentioned above is associated with each paystation in the telephone system. One means for placing this tone on the C lead is described in my above mentioned copending application, where particular levels of the linefinder switch bank are assigned to paystations, and normal post springs operate to place the tone on the C lead when the linefinder is operated to one of said levels. This tone is extended over the C lead, through contact 103 in the CLR trunk, through the bottom half of relay 80, and is thereby induced into the top winding of relay 80 and transmitted to the operator over the above described circuit. As will be pointed out below, relay 60 operates immediately after the operation of relay 70, and opens the ring-back tone circuit at contacts 61. Thus, since the ring-back tone is removed from the line at about the same time the identity tone is applied, the two tones do not conflict. This identity tone is transmitted to the operator throughout the slow-release intervals of relays 100 and 90, the circuit to relay 90 being opened when relay 100 restores. When relay 90 restores, contacts 91 and 92 open the above described identity tone circuit.

Relay 60 operates, immediately following the operation of relay 70, over the above described circuit, and the contacts associated therewith cause the following operations: contact 61 opens the ring-back tone circuit to remove this tone from the line; contact 62 completes an obvious circuit for operating relay 50; contact 63 completes a locking circuit for relay 60, including contact 113; contact 64 opens the circuit to lamp L1, causing this lamp to go out, thereby indicating to the operator that the circuit is in condition for her to converse with the calling subscriber; contact 65 places a short-circuit around contact 103 so that the C lead will remain grounded when relay 100 restores (relay 100 remains operated, due to the slow-release feature, until after relay 60 operates); and contact 66 opens a further point in the resistance battery circuit including resistance 57, so that this battery potential is not applied to the C lead when relay 100 restores.

The locking circuit of relay 60 including contacts 63 and 113 prevents the ring-back tone circuit from being reestablished in the event the operator re-checks the identity tone. This re-check is made by removing, and then re-inserting the plug at the operator's station. The removal of this plug restores relay 70, whereupon relays 100 and 90 reoperate. Relay 60 does not restore, due to the locking circuit described above. When the plug is re-inserted, relay 70 reoperates and the identity tone circuit is completed through contacts 71 and 72. The operator hears this tone until 100 and 90 restore in the manner above described.

Relay 50 operates following the operation of relay 60, and the contacts associated therewith cause the following operations: contacts 51, 52, 53 and 54 reverse the lines to the preceding equipment so as to switch the subscriber's line through to the CLR trunk by causing the paystation repeater to switch-through in the well-known manner; contact 55 completes an operating circuit for relay 30, including contact 41, lamp L3, and the −110 v. source of potential; and contact 56 opens the operating circuit of relay 40, relay 40 remaining operated due to its slow-release feature.

Relay 30 operates over the above described circuit, and completes a circuit for energizing relay 20. Relay 20 is designed so as to be slow-to-operate, and this operating time in addition to the operate time of relay 30, provides the necessary time interval during which the paystation repeater switches through. This switch-through operation is initiated when relay 50 operates, in the manner described above, and the −110 v. refund voltage will not be effective to refund the coin at the paystation until said switch-through is completed. Thus, when relay 20 operates to close contacts 22 and 24, the switch-through operation is completed, and the refund voltage is applied through lamp L3 to lines −L and +L simultaneously. The coin is thereby refunded at the paystation in the well-known manner.

Slow-release relay 40 remains operated until after relay 20 operates, and then relay 40 restores. Restoration of relay 40 causes contact 41 to open, thereby removing the refund battery from the line and from relay 30. Relay 30 then restores, whereafter relay 20 restores.

The calling party at the paystation is now connected through the CLR trunk to the operator, relays 50, 60, 70 and 110 being operated in said trunk, and the operator proceeds to complete the call in the well-known manner.

When the connection between the calling and called parties is completed, and if the operator determines that the calling party is entitled to a 5 minute initial time period, she depresses key 213 to start the call timing mechanism. If she determines that only a 3 minute time period should be allowed, she depresses key 215 first, and then depresses key 213. The function of these keys will now be described.

Let us assume that an initial time period of 5 minutes is appropriate for the call being made, and that the operator has depressed key 213 only. Relay 120 operates over a circuit including contacts 162, 175, 77, and ground at contact 210. Contact 211 of key 213 prepares a point in a circuit for operating lamp L2.

Relay 120 operates, and causes the following operations: contact 121 connects 5 minute time pulse lead 126 through contacts 133, 176 and 121, to motor magnet 150 and battery; contact 122 opens a further point in the normalizing circuit of motor magnet 150; contact 123 completes the operating circuit for lamp L2, including contacts 201, 143, 211, and 123; and contact 124 completes an obvious locking circuit for relay 120. Operation of lamp L2 indicates to the operator that the timer has started, and she then releases the key 213. It should be noted here that if disks 160, 170 and 180 are not at their home position when key 213 is depressed, contact 162 will be open and prevent the operation of relay 120, thereby in turn preventing the operation of lamp L2. The operator merely holds the key 213 operated until the disks are returned to the home position as shown, whereupon relay 120 and lamp L2 operates in the manner described above.

As each time pulse is transmitted over lead 126, motor magnet 150 operates and causes the three disks 160, 170, and 180 to be simultaneously rotated in the well-known manner. When these cams take the first rotary step, cam 161 moves away from cam follower 164, causing contact 162 to open and contact 163 to close. Contact 162 opens the operating circuit of relay 120, this relay being now locked operated to ground at contact 76; and contact 163 prepares a point in the normalizing circuit that will subsequently cause the disks to be returned to the home position.

Near the end of the allotted time period, cam 181 moves into contact with cam follower 182 causing contact 183 to be closed. The time tone on lead 127 is thereby transmitted to the calling line over an obvious circuit, thereby notifying the calling party that the initial time period is about to expire. The tone is removed from the line when the disks are further rotated to disengage cam 181 and cam follower 182.

At the expiration of the initial time period, cam 171 is rotated into contact with cam follower 172, causing contacts 173 and 174 to be closed, and contacts 175 and

176 to be opened. Contact 173 completes a circuit through contacts 212, 143 and 201 for operating lamp L2 and thereby notifying the operator that the 5 minute time period has expired; contact 174 closes a point in the operating circuit of relay 140; contact 175 opens a further point in the operating circuit of relay 120; and contact 176 opens the pulsing circuit to motor magnet 150 to thereby prevent the disks from rotating further. Lamp L2 is thereby held operated pending further action by the operator.

In response to this signal, the operator again depresses key 213, and simultaneously operates the necessary equipment (not shown) for ticketing the overtime period. Relay 140 operates over a circuit including contacts 210, 77 and 174; and contacts 211 and 212 transfer the circuit for holding lamp L2 operated from ground at contact 173 to ground at contact 123. Thus, lamp L2 is held operated until relay 140 operates and thereby opens contact 143, whereupon the lamp goes out and the operator releases key 213. It should be noted here that contact 141 closes an obvious holding circuit for relay 140, to prevent this relay from restoring when key 213 is released.

When the conversation is completed, the calling party restores the telephone handset to the cradle, thereby opening the circuit to relay 110, and relay 110 restores. Contact 111 opens a further point in the operating circuit of relay 100; contact 112 places ground on the jack sleeve at the operator's location, causing a supervisory signal (not shown) in the operator's cord circuit to operate; contact 113 opens one of the holding circuits for relay 60, this relay being now held operated by ground at contact 75; contact 114 connects lamp L2 to ground pulse lead 81, causing the lamp to flash on and off; and contact 115 opens a further point in the operating circuit of relay 40.

When the flashing signal is noted by the operator, she realizes that the call is completed, and that she must ring the paystation immediately in order to collect for the overtime period. This is accomplished in any well-known manner, whereby any well-known means under control of the operator is momentarily operated to cause the temporary operation of recall relay 10, over an obvious circuit. A circuit is then completed, including contacts 12 and 14 for ringing the calling paystation. The calling party then answers the ring, thereby reoperating relay 110 and opening the circuit to lamp L2, and the operator then requests coins for the overtime period.

After the requested coins are deposited, the operator removes the plug from the jack having sleeve 205, thereby opening a further point in the circuit to lamp L2 at contact 201, and also opening the circuit to relay 70 at contact 202. Contacts 71 and 72 open points in the above described identity tone circuit; contact 73 opens the locking circuit of relay 140 (and also relay 130, if it was operated); contact 74 closes a point in the operating circuit of relay 100, this circuit being now open at contact 111 since the calling party will have restored his handset once again; contact 75 opens the holding circuit to relay 60, causing relay 60 to restore; contact 76 opens the holding circuit to relay 120, causing relay 120 to restore; and contact 77 opens a further point in the operating circuits of relays 120 and 140.

Relay 60 restores, thereby opening contact 62 and causing relay 50 to restore, opening contact 65 to remove ground from the C lead, and closing contact 66 to again place resistance battery on the C lead. When ground is removed from the C lead, the paystation repeater is released, and restores to normal. During the restoration of said repeater, a circuit therein (not shown) is operative to collect any coins remaining uncollected at the paystation. When relay 120 restores, a circuit is completed from motor magnet 150, through contacts 151, 122 and 163 to ground. Motor magnet 150 then steps the disks 160, 170 and 180 until cam 161 contacts cam follower 162, thereby opening this self-interrupted circuit. Restoration of the repeater causes the other circuits in the system to restore, and these circuits, including the CLR trunk, will then be back to normal, and ready to handle other calls.

It should be noted here that if the calling party terminates the call before the initial time period comes to an end, the operator is notified by means of the above mentiond supervisory signal in her sleeve circuit, this being operated by ground at contact 112. In that case, the operator merely disconnects in the manner above described, without ringing the calling paystation.

If the operator has requested coins and has not been able to establish the call, she is required to refund before she disconnects. This is done by inserting plug 207 into circuit connection with contacts 206, and then depressing non-locking key 209. Relays 30 and 20 then operate, and the coins are refunded, as described above. Key 208 may be used to collect the coins, should the operator so desire. Relay 30 will operate from either the —110 v. or +110 v. source of potential.

In order that the operation of lamp L2 will be more obvious to the operator, a buzzer could be connected in series with the lamp. In that case, the operator's attention would be immediately called to the intermittent operation of the signal, and perhaps facilitate a faster ringing of the calling paystation so as to collect coins for overtime.

As mentioned above, if the call completed by the operator is of a type that is entitled to only a 3 minute initial time period, for example a long distance call, or short haul person to person call, the operator must depress non-locking key 215 before depressing key 213. Operation of key 215 completes an obvious operating circuit for relay 130, causing relay 130 to operate and lock operated over contacts 131 and 70. Thus, relay 130 remains operated when key 215 is released. Contacts 133 and 132 of relay 130 transfer the above described pulsing circuit for magnet 150 from lead 126 to lead 125, whereupon the above described timing operations occur over a 3 minute period of time instead of 5 minutes.

What has been described is considered to be the preferred embodiment of my invention and it is to be understood that modifications may be made in the structure and organization of my invention in addition to those described without departing from the spirit thereof as defined in the appended claims.

What I claim is:

1. In an automatic paystation telephone system; a calling paystation line; an operator's position; a CLR trunk at said position seized by said calling paystation line on an incoming call; operator controlled means at said position for answering said call and for completing a connection between said calling paystation line and said operator's position; a key at said position; timing means in said trunk; starting means in said trunk controlled by the actuation of said key after completion of said connection for initiating the operation of said timing means; means for stopping said timer at the expiration of a predetermined period of time; a signal at said operator's position; a first signal operating circuit for said signal, including contacts on said timer and contacts in said key in serial relation with said signal, completed by said timer at the expiration of said time period to continuously operate said signal to thereby notify the operator that said time period has expired; transfer means in said trunk; a circuit for operating said transfer means, including contacts on said timing means and contacts on said key in serial relation with said transfer means, completed in response to a reoperation of said key; means operated responsive to the operation of said transfer means for opening said first signal operating circuit to terminate said continuous operation of said signal; a second signal operating circuit for said signal prepared in response to the operation of said transfer means; and means operated in response to disconnection by said calling paystation for completing said second signal operating circuit to notify the operator that the call is terminated.

2. In an automatic paystation telephone system such as claimed in claim 1, including a second key at said position, and means in said trunk controlled by the operation of said second key prior to the first operation of the first said key for changing the period of time from said predetermined period to a different length predetermined period.

3. In an automatic paystation telephone system such as claimed in claim 2, wherein said timing means comprises a plurality of rotatable disks and a stepping magnet for causing the simultaneous rotation thereof, a cam on each of said disks, the cam on a first one of said plurality of disks effective to control the rotation of said disks for the selected predetermined period after the initiation of said operation of said timing means, a source of tone and a circuit therefor, the cam on a second one of said plurality of disks effective for completing said tone circuit by connecting said tone to said connection to notify said calling line that the selected time period is about to expire, and the cam on a third one of said plurality of disks effective to cause the completion of said first signal operating circuit at the end of the selected time period.

4. In an automatic paystation telephone system such as claimed in claim 3, including a self-interrupting circuit for operating said stepping magnet to thereby cause said disks to return to a normal position, and means in said trunk operated under control from said operator's position for completing said self-interrupted circuit.

5. In an automatic paystation telephone system, a calling paystation line, an operator's position, a CLR trunk at said position seized by said calling paystation line on an incoming call, operator controlled means at said position for answering said call and for completing a connection between said calling paystation line and said operator's position, a key at said position, timing means in said trunk having a starting position and a stopping position, contacts controlled by said starting position of said timing means and contacts controlled by said stopping position of said timing means, starting means in said trunk for initiating the operation of said timing means from said starting position, circuit means including a pair of the said contacts in said starting position and a pair of the said contacts in said stopping position completed in response to the actuation of said key after completion of said connection to operate said starting means, means for maintaining said starting means operative independent of the said pair of contacts in said starting position to continue the advance from said timing means to said stopping position, other contacts in said stopping position operated responsive to said timing means being advanced to said stopping position for stopping further advance of said timing means, signalling means at said operator's position, means for operating said signalling means in a distinctive manner only while said actuation of said key takes place to indicate the start of said timing means, said signalling means non-operated after restoration of said key and during said advance of said timing means to said stopping position, and means including still other contacts in said stopping position operated in response to said timing means being stopped in said stopping position for operating said signalling means in a different distinctive manner.

References Cited in the file of this patent

UNITED STATES PATENTS

| | | |
|---|---|---|
| 2,533,677 | McCreary | Dec. 12, 1950 |
| 2,724,741 | Lomax | Nov. 22, 1955 |
| 2,807,667 | Gratzert | Sept. 24, 1957 |